(12) United States Patent
Jauert et al.

(10) Patent No.: US 7,208,688 B2
(45) Date of Patent: Apr. 24, 2007

(54) APPARATUS WITH A PLUGGABLE SCALE MODULE

(75) Inventors: Joachim Jauert, Berlin (DE); Axel Ortmann, Berlin (DE); Tilmann Schilling, Berlin (DE)

(73) Assignee: Francotyp-Postalia GmbH (DE)

( * ) Notice: Subject to any disclaimer, the term of this patent is extended or adjusted under 35 U.S.C. 154(b) by 84 days.

(21) Appl. No.: 11/175,068

(22) Filed: Jul. 5, 2005

(65) Prior Publication Data

US 2006/0006006 A1 Jan. 12, 2006

(30) Foreign Application Priority Data

Jul. 6, 2004 (DE) ............... 20 2004 010 859

(51) Int. Cl.
  *G01G 21/28* (2006.01)
  *H05K 5/02* (2006.01)
(52) U.S. Cl. ........................ 177/238; 174/51
(58) Field of Classification Search ........ 177/126–128, 177/238–244; 174/51
  See application file for complete search history.

(56) References Cited

U.S. PATENT DOCUMENTS

| 3,987,344 | A | 10/1976 | Ambruoso, Sr. et al. |
| 4,008,942 | A | 2/1977 | Grossi |
| 4,332,174 | A * | 6/1982 | Suzuki et al. .......... 73/862.633 |
| 4,439,809 | A | 3/1984 | Weight et al. |
| 5,723,826 | A * | 3/1998 | Kitagawa et al. ............. 177/21 |
| 6,064,991 | A | 5/2000 | Reisinger et al. |
| 7,002,084 | B2 * | 2/2006 | Cox et al. .................... 177/238 |
| 2002/0131226 | A1 | 9/2002 | Oldfield et al. |
| 2002/0138453 | A1 | 9/2002 | Fearis et al. |

FOREIGN PATENT DOCUMENTS

DE         101 14 529 A1    10/2002

* cited by examiner

*Primary Examiner*—Randy W. Gibson
(74) *Attorney, Agent, or Firm*—Schiff Hardin LLP

(57) ABSTRACT

An apparatus, such as mail processing apparatus, has a housing with a cavity therein, a grounded metal chassis in the housing, an electronics mainboard in the housing having a first plug and contact arrangement, with a scale module that is pluggable into the cavity of the housing. The scale module has a base plate having a grounding arrangement, and a load cell and weighing electronics both mounted on the base plate. The weighing electronics has a second plug and contact arrangement that mates with the first plug and contact arrangement when the scale module is plugged into the cavity. A metal part in the housing is mechanically connected to the chassis and has a plate part that protrudes into the cavity. This plate part makes planar electrical contact with the grounding arrangement of the base plate, to produce a grounding path for the base plate, substantially immediately at the beginning of the act of plugging the scale module into the cavity.

19 Claims, 2 Drawing Sheets

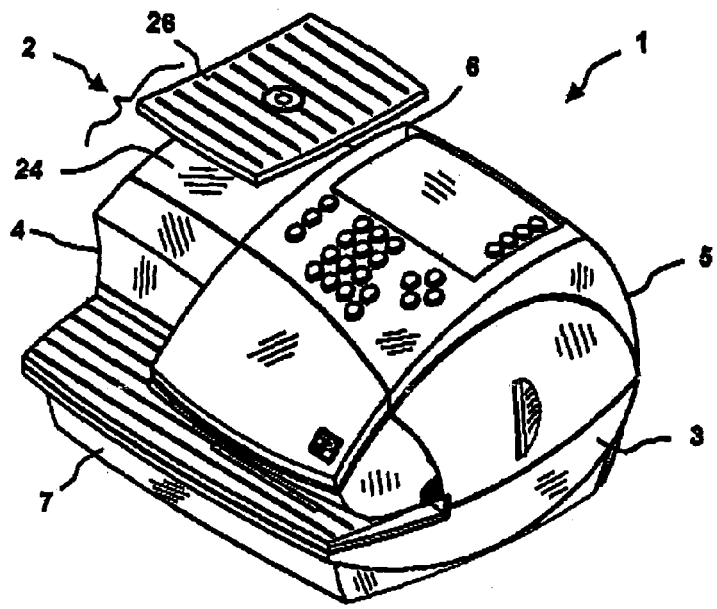
Fig. 1
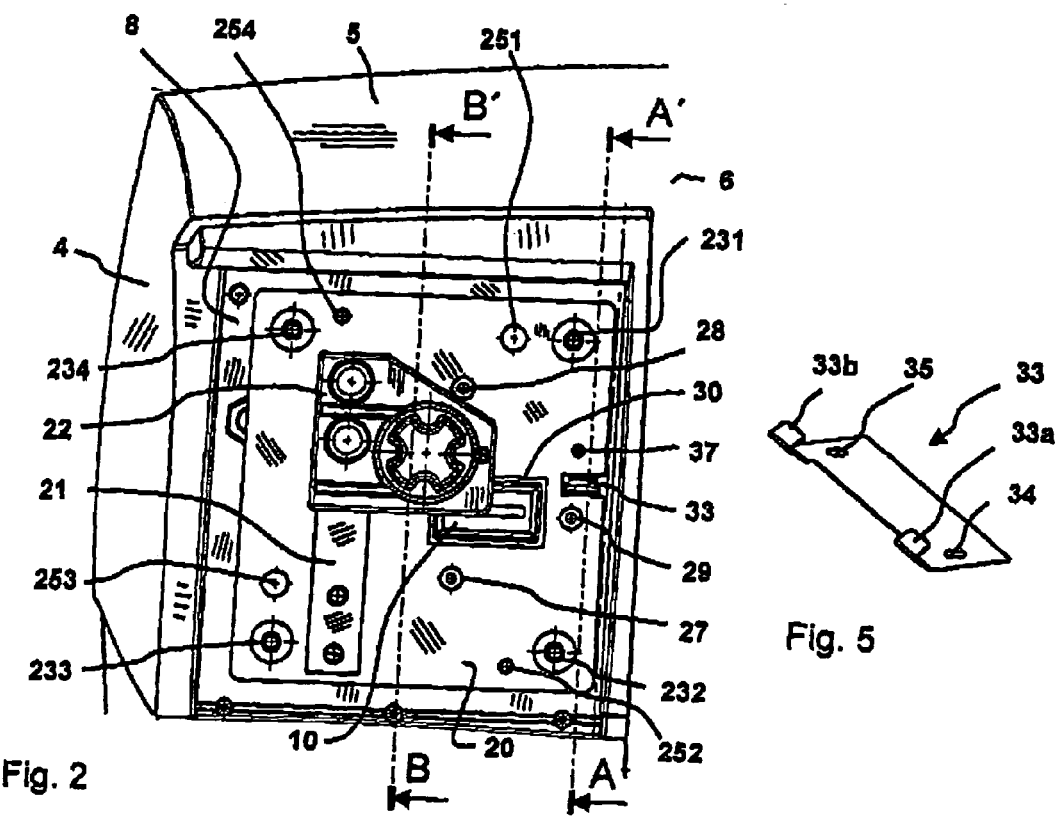
Fig. 2
Fig. 5

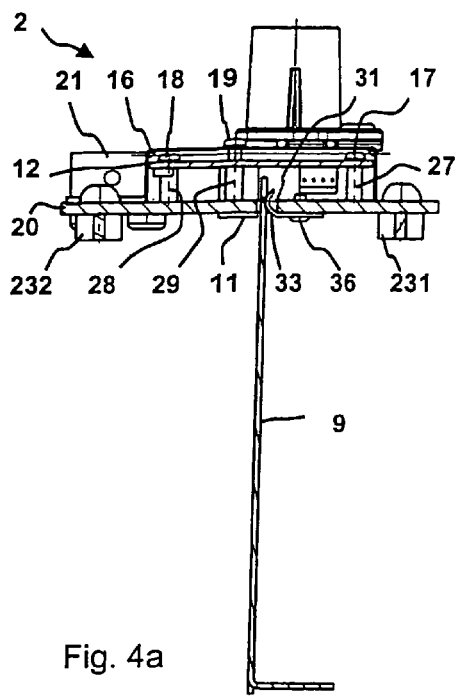
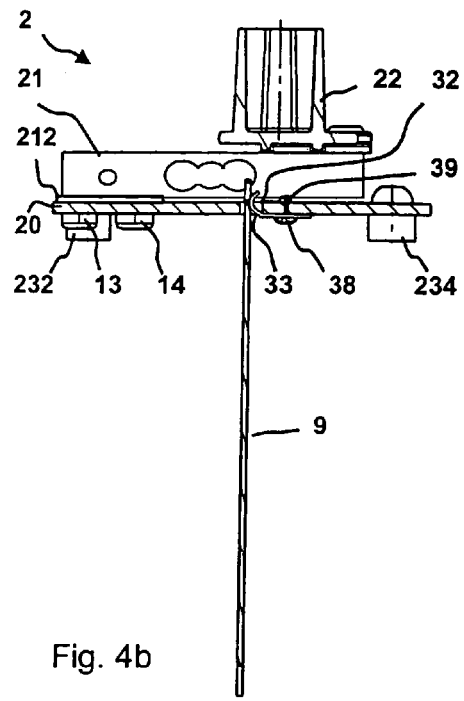
Fig. 4a
Fig. 4b
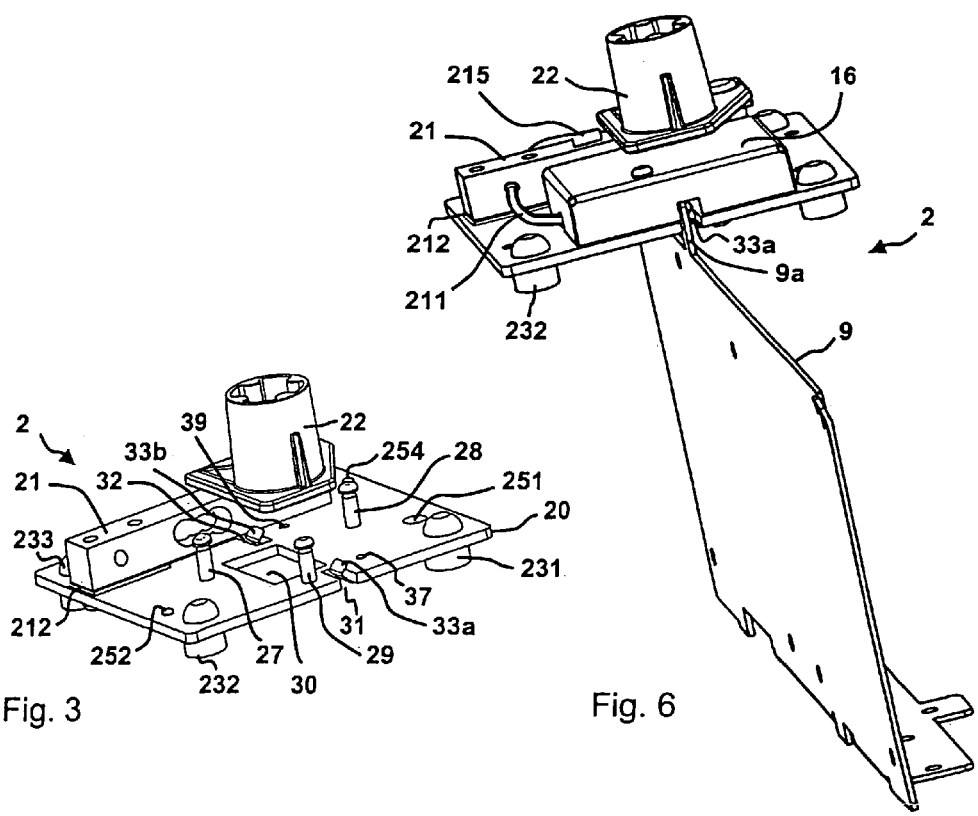
Fig. 3
Fig. 6

APPARATUS WITH A PLUGGABLE SCALE MODULE

BACKGROUND OF THE INVENTION

1. Field of the Invention

The present invention concerns, an apparatus, such as a mail processing apparatus, of the type having a cavity in which a scale module can be plugged, the cavity being covered by a cover if the scale module is not being used.

2. Description of the Prior Art

A known franking machine Jetmail® by the manufacturer Francotyp Postalia Beteiligungs AG is commercially available for offices with average to high mailing needs and has a fixed, installed, static scale. A plate part establishes a ground connection with the chassis of the franking machine. The franking machine evaluates the weight measurement values and has a postage computer in order to ultimately print out a franking value on a mailpiece.

A franking machine for users with small mailing needs is also known to which an external postage scale can be attached via a cable. Inside a security housing, the franking machine T1000, also commercially available from Francotyp-Postalia Beteiligungs AG, has a fixed thermotransfer print head for printing a franking imprint and a standard interface for connection of the postage scale. If the scale fails due to an electrostatic discharge, the franking machine still can be operated with the franking value being manually entered. The franking machine has a metallic chassis for discharging electrostatic charges, and for reduction of interfering irradiation, and the interference resistance is further increased by an electrically-conductive protective coating applied internally on the security housing. Protection of both the scale and the franking machine, however, would require a relatively high expenditure. The RS232 interface between the franking machine and the external postage scale contains a driver and level converter for decoupling of both devices. Moreover, a connection cable is necessary for connection of the scale with the franking machine.

A weighing platform, model no. WP02/WP5, for weight measurement of a maximum mass of 2 kg, is known, which alternatively can be arranged next to or on the housing of an inkjet franking machine of the type Neopost IJ45, and can be connected via a cable (FACTS, das Testmagazin furs moderne Büro, issue 5, May 2003, 10th volume). The weighing platform has neither display nor keyboard and is thus is relatively inexpensive. The aforementioned disadvantages persist; moreover, the weighing platform is placed only loosely on the housing and thus is unattached thereto.

Inside a security housing, the known franking machine mymail® commercially available from Francotyp-Postalia Beteiligungs AG, the manufacturer has a movably-arranged inkjet print head for printing a franking imprint. The housing is formed of an upper housing part and lower housing part, the former being fashioned for attachment of an upgradeable (retro-fittable) weighing unit. According to German patent application DE 101 14 52 9, the first housing part has a cavity (indentation) that is fashioned for insertion of the weighing unit. An attachment arrangement for attachment of a cap that seals the cavity is provided in the region of the cavity. The cap is removed before the attachment of the upgradeable weighing unit for which the attachment arrangement is used. The attachment arrangement is fashioned pin-like and the upgradeable weighing unit has rubber feet with corresponding openings for insertion of the rubber feet on the pin-like attachment arrangement. Grounding of the weighing unit thus does not ensue via this attachment arrangement.

An electrical connection of the weighing unit with the franking machine mymail® ensues exclusively via a scale connection cable inside the housing. The interrogation of the digital weight value by the microprocessor proceed via an $I^2C$ bus. The mounting capability of the weighing unit is hampered by the necessity of providing contacting by plugging in a cable. Moreover, it is a disadvantage that the scale module exhibits both a relatively high irradiation and a relatively low interference resistance.

A scale module should possess substantial protection against damage due to electrostatic discharge (ESD) and with regard to electromagnetic interference (EMI).

In the prior art it is known to use thick, plaited ground cables for grounding, but more space in the housing is needed for this, that is often not available. In addition, cables generally exhibit a higher inductivity than, for example, planar ground connections, which disadvantageously affects the EMI behavior.

Furthermore, a use of CuBe springs for grounding is known (see www.infratron.de; www.zillkon.de).

SUMMARY OF THE INVENTION

An object of the present invention is to provide a pluggable scale module for an apparatus that does not exhibit the aforementioned disadvantages. In addition to an increase of the interference resistance and reduction of the irradiation, a simple contacting and reliable grounding should be achieved for the scale module, for example of a franking machine. The grounding of the scale module therefore should be optimally low-impedance and low inductive in spite of the requirement for simpler design and easier mounting capability. ESD protection should be ensured in the installation and de-installation of the scale module as well as during its operation. A further object is to design the system enclosing the scale module cost-effectively with low irradiation and interference resistance according to the approval conditions of the postal authority.

The above object is achieved in accordance with the present invention by an apparatus having a housing with a cavity therein, a grounded metal chassis in the housing, an electronics mainboard in the housing having a first plug and contact arrangement, with a scale module that is pluggable into the cavity of the housing. The scale module has a base plate having a grounding arrangement, and a load cell and weighing electronics both mounted on the base plate. The weighing electronics has a second plug and contact arrangement that mates with the first plug and contact arrangement when the scale module is plugged into the cavity. A metal part in the housing is mechanically connected to the chassis and has a plate part that protrudes into the cavity.

This plate part makes planar electrical contact with the grounding arrangement of the base plate, to produce a grounding path for the base plate, substantially immediately at the beginning of the act of plugging the scale module into the cavity.

Because the grounding path for the base plate is established virtually at the immediate beginning of the plug-in event, there is virtually no time during the plug-in event that the scale module is not grounded.

The invention is based on the concept of a wireless grounding in which the ground connection from the scale module to the main control board (mainboard) of the franking machine is realized in the form of a fixed metal part that exhibits a very low impedance and very low inductivity, which has the effect of both relatively low irradiation and a relatively high interference resistance of the scale component.

The first plug and contact arrangement is provided opposite an opening in a metallic base plate of the scale module in an embodiment wherein latter is situated on a planar base surface of a cavity of the apparatus housing, and the circuit board for the weighing electronics is connected with the metallic base plate via at least one attachment and connection element and has the second plug and contact arrangement compatible with the first plug and contact arrangement in the plug direction, so the grounding of the weighing electronics ensues separately from the plug and contact arrangement via a grounding path for the metallic base plate.

In a further embodiment the fixed metal part is a chassis part of the apparatus and the scale module uses a grounding spring attached to the metallic base plate for wireless grounding. Thus by plugging the scale module directly presses its grounding spring on the chassis part of the franking machine and establishes the electrical contact via a plane (two-dimensional) connection for the purpose of grounding.

DESCRIPTION OF THE DRAWINGS

FIG. 1 is a perspective view of an apparatus in the embodiment of a franking machine, with a pluggable scale module in accordance with the invention.

FIG. 2 is plan view of the base plate of the pluggable scale module at a franking machine without covering housing parts in accordance with the invention.

FIG. 3 is a perspective view of a pluggable scale module without the housing, without the electronic circuit board and without the EMI shielding, in accordance with the invention FIG. 4a is a section of the scale module of FIG. 2 through section line AA'.

FIG. 4b is a section of the scale module of FIG. 2 through section line BB'.

FIG. 5 is a perspective view of a grounding spring in accordance with the invention.

FIG. 6 is a perspective view of a scale module plugged into a chassis part in accordance with the invention.

DESCRIPTION OF THE PREFERRED EMBODIMENTS

As an example of an apparatus in accordance with the invention, FIG. 1 shows a perspective view of a franking machine 1 with pluggable scale module 2 on the top side 6 at the corner between the left side 4 and the obscured back side 5. The scale module 2 has a covering 24 with an opening that is obscured by a plugged-in weighing plate 26. All housing parts, the covering 24 and the weighing plate 26 are produced, for example, from colored plastic. When the franking machine is to be operated without the pluggable scale module 2, a cap that has a shape similar to the covering 24 is plugged in instead of the scale module 2. Guidance of mail pieces to and from the printer (not shown) ensues on the front side 7 from the left side 4 and to the right side 3 of the franking machine 1.

FIG. 2 shows a plan view of a base plate of the pluggable scale module 2 on a franking machine with the covering 24 removed from the top side 6 at the corner between the left side 4 and the occluded back side 5 of the franking machine 1. When the cover 24 is removed, a cavity in exposed in an upper housing part. The cavity has a planar base 8 fashioned for insertion of the scale module 2. For better clarity, of the scale module only a metallic base plate 20 with weighing bar 21 (load cell) mounted on the top side, a weighing plate bracket 22 mounted on the weighing bar 21, with rubber feet 231, 232, 233, 234 mounted on its underside have been shown. The metallic base plate 20 has a first opening 30 in order to be able to contact an opposite first plug and contact arrangement 10 in the plugged-in state of the scale module 2. The first plug and contact arrangement 10 can be formed, for example, as a plug contact bank (card edge) of the mainboard of the franking machine. The metallic base plate 20 has attachment and connection elements 27, 28, 29 for the attachment of a mountable circuit board (not shown) and the electrical connection with the weighing electronics on the circuit board to its ground as well as for the attachment and grounding of a mountable EMI shielding of the circuit board. Metal bolts preferably are used such as fastening and connection elements. The circuit board has a second plug and contact arrangement 11 (female multipoint connector) matching with the first plug and contact arrangement 10 (male multipoint connector). The metallic base plate 20 has a second opening 31 for the arrangement for grounding thereof. A first section line AA' is shown passing through this second opening 31. A (threaded) hole 37 in the metallic base plate 20 is introduced near the opening 31 and the near the section line AA'. A second section line BB' passes through the weighing plate mount 22. A second (threaded) hole 39 is introduced in the metallic base plate 20 on the second section line BB', but this hole 39 is covered by the weighing plate mount 22. Both threaded holes 37 and 39 serve for attachment and contacting of a grounding spring 33 that is mounted on the underside of the metallic base plate 20. The grounding spring 33 contacts at least one metal tongue 9a when the scale module is plugged in. Openings 251, 252, 253, 254 for fastening and fixing the covering 24 are introduced into the metallic base plate 20.

FIG. 3 shows a perspective view of a pluggable scale module without the electronic circuit board and without the EMI shielding. The base plate 20 of the scale module 2 has metal bolts on the top as fastening and connection elements 27, 28, 29, rubber feet 231, 232, 233, 234 as well as openings 251, 252, 253, 254 on the bottom for fastening and fixing of the covering (not shown). On one half-side, the base plate 20 has a centered first opening 30. t its other half-side, the a weighing bar 21 is located which is attached at one end via a spacer plate 212 to the base plate 20 of the scale module 2 in the area of the rubber foot 233. The weighing plate mount 22 is attached at the other end of the weighing bar 21. The threaded holes 37, 39 serve for attachment and contacting of the grounding spring to the metallic base plate 20 in which further openings 31, 31 for metal tongues of the metal part and for the arms 33a, 33b of the grounding spring are introduced on both sides relative to the opening 30.

FIGS. 4a and 4b show section representations of the scale module 2. A chassis part of the franking machine forms a fixed metal part 9, which has been shown in contact with the grounding spring 33. The grounding spring 33 is fastened on the metallic base plate 20 by means of at least one contact and fastening element 36 or 38.

In the section representation of FIG. 4a, the scale module is shown cut by a section line AA' of FIG. 2. The section passes through the at least one second opening 31 of the metallic base plate 20 but passes by the (threaded) hole for a contact and fastening element 36 and through the fixed metal part 9. The contact and fastening element 36 is, for example, a threaded metallic screw for which the (threaded) hole 37 is provided in the metallic base plate 20. The fastening and connection elements are hereby at least one metal bolt 27, 29 with inner threading and screws 17, 18 for fastening of the mountable circuit board 12 with the weighing electronics. One bore hole per metal bolt is provided in the circuit board 12. A metal bolt 29 with inner threading and a screw 19 are likewise used here as fastening and connection elements for fastening of a mountable EMI covering 16.

In the section representation according to FIG. 4b, the scale module is shown cut by a section line BB' of FIG. 2. The metallic base plate 20 exhibits a further opening 32 for grounding. The second section line BB' passes through this further opening 32, the (threaded) hole 39 in the metallic base plate 20, through the weighing plate mount 22 and through the fixed metal part 9. The weighing bar 21 is fastened at one end via a spacer plate 212 to the base plate 20 by means of weighing bar screws, rivets or comparable fastening elements 13, 14. By directly plugging in the scale module 2, its grounding spring presses on the fixed metal part 9 or a chassis part of the franking machine and establishes the electrical contact via a planar connection for the purpose of grounding.

The grounding ensues via the grounding spring 33 (screwed onto the scale module) that contacts the metal tongues of the metal part 9 during the plugging event, in anticipation of the contact even of the plug and contact arrangement 10 as well as in the plugged-in state. The metal part 9 belongs to the plate chassis of the apparatus and forms the primary ground of a franking machine. The grounding ensues such that, upon plugging in the scale module 2, the grounding spring contacts first and afterwards the signal lines of the plug and contact arrangement 10; upon removal it is correspondingly reversed in order to prevent damages to the scale module 2 or to the franking machine due to ESD. It is provided that the grounding spring 33 is a CuBe spring with special design adapted to the plugging event. The mechanical design and arrangement of the grounding springs is such that two arms of the grounding spring 33 flank the electrical contact in order to generate a planar connection.

FIG. 5 shows a perspective view of a grounding spring that is fashioned as a two-arm leaf spring 33, the two arms 33a, 33b of which exhibit a similar curvature. The curvature ensues at least in the plug direction of the scale module or counter to this. The curvature can be directed to the extent that both arms 33a, 33b point in the same direction at the base but the ends of the arms point in the opposite direction. The ends of the arms 33a, 33b can also be rolled up. The two-arm leaf spring 33 has fastening openings 32, 34 close to the arms 33a, 33b, serving as holes for the screws 36 and 38 or comparable contacting and fastening elements.

FIG. 6 shows a perspective view of a scale module 2 plugged in on a metal part 9 without the housing. An arm 33a of the CuBe spring is shown in contact with the metal tongue 9a in the one visible second opening 31 of the metallic base plate 20. Both the further opening 32 and the other of the two metal tongues, for example the metal tongue 9b, have likewise been brought into contact with one another via the plugging event, but this is occluded in FIG. 6 and thus not shown.

The pluggable scale module is provided for weighing individual mail pieces and can be upgraded at any time by the customer. It is composed of, among other things, a weighing bar (load cell) and a circuit board with electronics. The load cell 21 is connected with the electronics on the circuit board via a shielded round cable 211. The circuit board is mounted on the metallic base plate 20 and supports an EMI covering 16 made from metal plate that has an opening for the round cable 211 (FIG. 6)

Such a weighing module K-DF2SR-3/10-FPMK by the company Hottinger Baldwin Messtechnik GmbH (HBM) is delivered to a customer completely calibrated when ordered. The weighing range is 5000 grams with a precision in the measurement range at reference temperature of 0 . . . 2 kg+/−1 g and 2 . . . 5 kg+/−5 g. The precision is guaranteed in the nominal temperature range +10 . . . +50° C. The load cell has a resistance strain gauge 15 whose resistance change is converted with a 16-bit A/D converter and transferred to the mainboard of the franking machine via an I$^2$C bus interface. A preload of approximately 150 g is specified for the load cell of the type DF2SR-3/10 kg. The electronics include a differential amplifier, 16-bit A/D converter ADS1100 with I$^2$C interface and EEPROM for load-specific data, EMI protective circuit as well as the direct plug connector Fischer DF OB 06 striving as the second plug and contact arrangement 11. Connection with the second plug and contact arrangement 11 occurs via a (not shown) tongue-shaped molding of the mainboard with contact surfaces arranged on both sides as a first plug and contact arrangement 10. The electronics require a voltage supply of 5 V (+5%, −7%). The weighing bar 21 is fastened on one side on the metallic base plate 20 by a spacer plate 222 with a thickness of 0.5 mm. Mechanical overload protection in the direction of gravity is achieved by the metallic base plate 20, which limits a downward deflection of the weighing bar 21 on its other side.

A number of alternative arrangements are possible. For example, a number of metal tongues can be provided on the metal part and a corresponding number of second openings can be provided in the metallic base plate as well as a corresponding number of arms of the grounding springs. As an alternative to a metallic base plate 20, the latter can also be produced from an electrically-conductive plastic that can have metallic and/or metallized contact surfaces. Special spring contacts also can be used as grounding springs. Alternatively, edge connectors/female multipoint connectors or another comparable plug connector can be used as the plug and contact arrangements 10, 11. Furthermore, plugs and jacks can be used interchangeably with one another.

Although modifications and changes may be suggested by those skilled in the art, it is the intention of the inventors to embody within the patent warranted hereon all changes and modifications as reasonably and properly come within the scope of their contribution to the art.

We claim as our invention:

1. An apparatus comprising:
   a housing having a cavity therein;
   a grounded metal chassis in said housing;
   an electronics mainboard in said housing having a first plug and contact arrangement;
   a scale module pluggable into said cavity of said housing in a plug-in event, said scale module comprising a base plate having a grounding arrangement, and a load cell and weighing electronics both mounted on said base plate, said weighing electronics comprising a second plug and contact arrangement mating with said first plug and contact arrangement when said scale module is plugged in said cavity; and
   a metal part in said housing mechanically connected to said chassis, having a plate part protruding into said cavity, said plate part making a planar electrical contact with said grounding arrangement, to produce a grounding path for said base plate, substantially immediately at a beginning of said plug-in event.

2. An apparatus as claimed in claim 1 wherein said cavity has a cavity base in which said first plug and contact arrangement is disposed, facing said cavity, and wherein said base plate has an opening therein into which said first plug and contact arrangement project when said scale module is plugged in said cavity to mate with said second plug and contact arrangement, and wherein said scale module comprises an electrically conductive element electrically connecting said weighing electronics to said base plate, with grounding of said weighing electronics being established exclusively by said grounding path for said base plate.

3. An apparatus as claimed in claim 1 wherein said weighing electronics comprises a circuit board fastened to said base plate with at least one metallic screw and metallic bolt, said metallic bolt having an interior threading.

4. An apparatus as claimed in claim 1 wherein said weighing electronics comprises a circuit board fastened to said base plate with at least one metallic screw and metallic bolt, said metallic bolt having an exterior threading.

5. An apparatus as claimed in claim 1 wherein said grounding arrangement of said base plate comprises at least one opening in said base plate into which said plate part moves during said plug-in event.

6. An apparatus as claimed in claim 5 wherein said grounding arrangement of said base plate comprises a grounding spring electrically conductively fastened on said base plate said grounding spring having at least one spring portion disposed in said at least one opening in said base plate and making said planar electrical contact with said plate part.

7. An apparatus as claimed in claim 6 wherein said grounding spring is a leaf spring comprised of CuBe.

8. An apparatus as claimed in claim 6 wherein said grounding arrangement comprises a plurality of openings and wherein said grounding spring comprises and equal plurality of curved spring portions respectively disposed in said plurality of openings.

9. An apparatus as claimed in claim 8 wherein each curved spring portion has a curvature proceeding in a plug-in direction of said scale module and in a direction opposite to said plug-in direction.

10. An apparatus as claimed in claim 9 wherein said spring portions are rolled elements forming said curvature.

11. An apparatus as claimed in claim 9 wherein said grounding spring comprises a spring base from which spring elements project, and wherein each of said spring elements comprises a free end oriented in said plug-in direction and a base end, attached to said spring base, proceeding in said direction opposite to said plug-in direction.

12. An apparatus as claimed in claim 8 wherein said spring base comprises a plurality of fastening openings respectively disposed adjacent said plurality of spring portions.

13. An apparatus as claimed in claim 12 comprising a plurality of fastening elements proceeding through said fastening openings and into said base plate to fasten said grounding spring to said base plate.

14. An apparatus as claimed in claim 1 wherein said housing has a housing shape and wherein said scale module has a module housing, covering said cavity when said scale module is plugged in said cavity, conforming to said housing shape, said housing and said module housing being comprised of plastic.

15. An apparatus as claimed in claim 1 wherein said housing is a security housing having an upper housing shell, and wherein said cavity is disposed in said upper housing shell.

16. An apparatus as claimed in claim 1 wherein said scale module comprises EMI shielding electrically conductively fastened to said base plate and covering said weighing electronics, said EMI shielding being grounded via said grounding path for said base plate.

17. An apparatus as claimed in claim 1 wherein said first and second plug and contact arrangements are selected from the group consisting of plugs, jacks, and circuit board edge connectors.

18. An apparatus as claimed in claim 1 wherein said first plug and contact arrangement comprises a projection of said mainboard having opposite sides with electrical contact surfaces disposed on both of said opposite sides, and wherein said second plug and contact arrangement comprises an electrical connector that receives said projection of said mainboard.

19. An apparatus as claimed in claim 1 wherein said housing is a housing for a franking machine.

\* \* \* \* \*